United States Patent [19]

Muramatsu et al.

[11] 4,313,617
[45] Feb. 2, 1982

[54] CAMBER ADJUSTING DEVICE IN STRUT TYPE SUSPENSION SYSTEM

[75] Inventors: Tadao Muramatsu; Yasuhiko Ichihashi, both of Toyota, Japan

[73] Assignee: Toyota Jidosha Kogyo Kabushiki Kaisha, Toyota, Japan

[21] Appl. No.: 128,082

[22] Filed: Mar. 7, 1980

[30] Foreign Application Priority Data

Mar. 28, 1979 [JP] Japan .......................... 54-41177[U]

[51] Int. Cl.³ .......................................... B62D 17/00
[52] U.S. Cl. .................................... 280/661; 280/95 R
[58] Field of Search .................... 280/661, 95 R, 668; 267/34

[56] References Cited

U.S. PATENT DOCUMENTS

| | | | |
|---|---|---|---|
| 3,917,308 | 11/1975 | Schulz | 280/661 |
| 4,194,760 | 3/1980 | Shiomi | 280/661 |
| 4,213,631 | 7/1980 | Wilkerson | 280/661 |

*Primary Examiner*—Robert R. Song
*Attorney, Agent, or Firm*—Stevens, Davis, Miller & Mosher

[57] ABSTRACT

A camber adjusting device in a strut type suspension system, comprising first and second clamp means for connecting a support bracket and a steering knuckle for supporting a strut at opposite ends and an eccentric adjustment piece rotatably provided on one of said first and second clamp means. Rotation of said eccentric adjustment piece causes said one of clamp means is displaced about the other clamp means by a value of eccentricity of said adjustment piece, whereby said strut is displaced with respect to said steering knuckle to thereby adjust the camber angle.

3 Claims, 5 Drawing Figures

४,३१३,६१७

CAMBER ADJUSTING DEVICE IN STRUT TYPE SUSPENSION SYSTEM

BACKGROUND OF THE INVENTION

1. Field of the Invention

This invention relates to a chamber adjusting device in a strut type suspension system.

2. Description of the Prior Art

In general, there have been used a variety of types of suspension systems in vehicles, one of which is a Mc. Pherson type. Said Mc. Pherson type suspension system, which has been widely used, is a strut type suspension system using struts for absorber shafts.

However, the conventional strut type suspension system has no camber adjusting mechanism, and hence, in case a preset camber angle has gone wrong due to veriations in assembling of the suspension system, deformation of a body and the like, there occur some cases where harmful phenomenona such as ununiform wear of tires of the vehicle.

SUMMARY OF THE INVENTION

This invention has been developed to obviate the abovedescribed disadvantages of the prior art, and has as its object the provision of a camber adjusting device in a strut type suspension system wherein, in case a preset camber angle has gone wrong due to some cause or other, said camber angle can be readily, variably adjusted by use of a very simple adjusting mechanism.

To accomplish the abovedescribed object, the camber adjusting device in the strut type suspension system according to the invention is characterized in that: a support bracket and a steering knuckle for supporting a strut are connected to the strut at opposite ends thereof in the axial direction by means of first and second clamp means; a rotatable eccentric adjustment piece is provided on one of said first and second clamp means; one of said clamp means is displaced by a value of eccentricity about the other of said clamp means by rotating said adjustment piece; and said strut is displaced with respect to said steering knuckle to thereby adjust the camber angle.

In addition, the abovedescribed and other advantages of the present invention will become apparent more fully from the description of the following embodiments in conjunction with the accompanying drawings.

DETAILED DESCRIPTION OF THE PREFERRED EMBODIMENT

Figure 1:
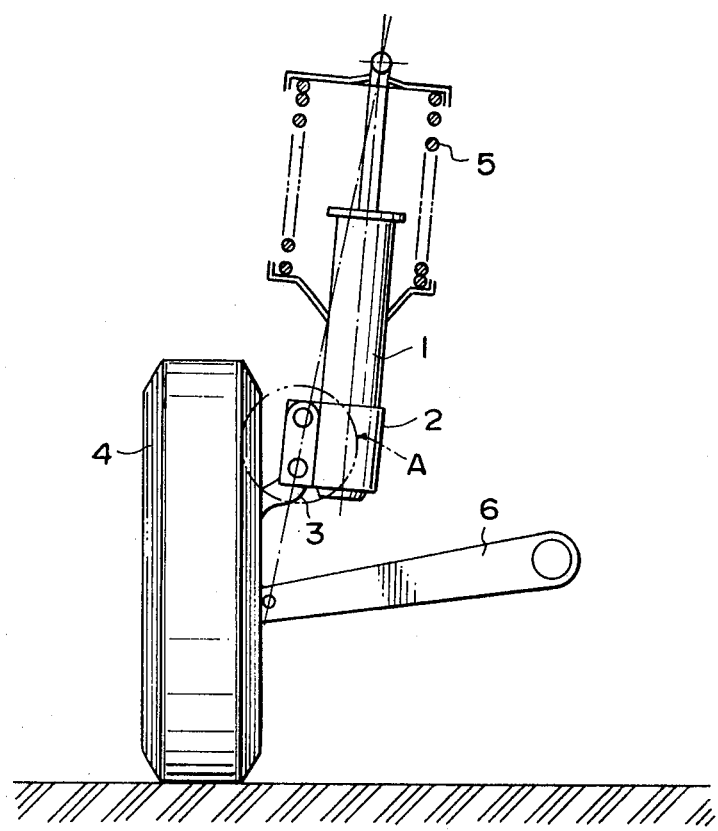
FIG. 1 shows a state of an example of the strut type suspension system into which the camber adjusting device according to the present invention is assembled, as viewed from forward of a vehicle.

As shown in FIG. 1, in the strut type suspension system, a strut 1 constituting an absorber shaft is connected at the lower end thereof to the forward end of a steering knuckle 3 extended from a tire 4 through a support bracket 2. In addition, in FIG. 1, reference numeral 5 indicates a suspension spring, and reference numeral 6 a suspension lower arm.

The camber adjusting device according to the present invention is adapted to be assembled into a portion A of the strut type suspension system as shown in FIG. 1. Description will hereunder be given of an embodiment of the camber adjusting device according to the present invention with reference to FIGS. 2 to 4B.

Figure 2:
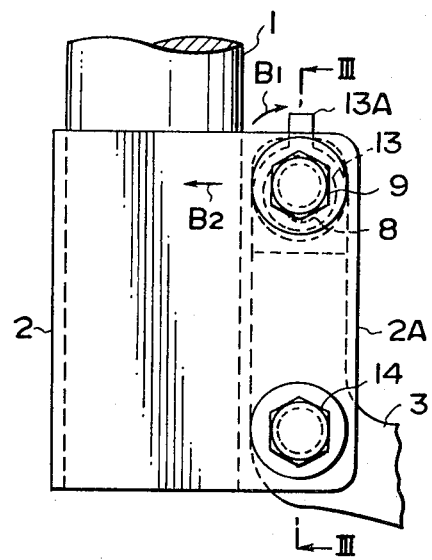
FIG. 2 is a side view showing an embodiment of the camber adjusting device according to the present invention.

As shown in FIG. 2, a support bracket 2 is provided at the lower end of the strut 1 in a manner to surround and clamp to lower end of the strut 1. Furthermore, as shown in FIG. 3 as well, the steering knuckle 3 is secured to a position at the lower end of the strut 1 in the axial direction in a manner to be clamped between opposing flanges 2A of said support bracket 2, whereby the strut 1 and the steering knuckle 3 are connected to each other through the support bracket 2.

A through-hole 7 for receiving a bolt is formed at a portion adjacent the upper end of said steering knuckle 3 in the crosswise direction. Furthermore, a guide hole 8 for guiding a bolt is formed at a portion adjacent the upper end of the flange portions 2A of the support bracket 2 at such a position as to aligned with the through-hole 7 of said steering knuckle 3 when said steering knuckle 3 is mounted. As apparent from FIG. 2, said guide hole 8 is formed to provide an elongated slot in the axial direction of the strut 1.

A bolt, i.e., first clamp means is horizontally inserted through the guide hole 8 of said support bracket 2 and the through-hole 7 of said steering knuckle 3. As apparent from FIG. 2, a nut 10 is fastened onto bolt 9 through washers 11 and 12, whereby the flange portions 2A of the support bracket 2 are clamped from opposite sides of the steering knuckle 3 and fixed thereat.

Figure 3:
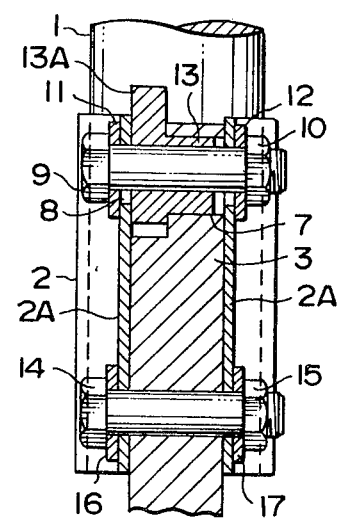
FIG. 3 is a sectional view taken along the line III—III in FIG. 2.

As shown in FIG. 3, an eccentric adjustment piece 13 for adjusting the camber, which is rotatable in a through-hole 7 of said steering knuckle 3 is provided around the stud portion of said bolt 9.

Figure 4A:
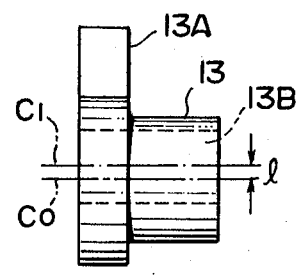
FIGS. 4A and 4B are a front view and a side view, respectively, showing the adjustment piece for the camber adjusting device according to the present invention.
Figure 4B:
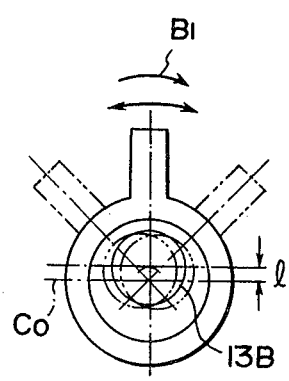

Construction of said adjustment piece 13 is detailedly shown in FIGS. 4A and 4B as well, said adjustment piece 13 has a rotatable lever portion 13A for tool coupling, which is projected upwardly of the upper end of said steering knuckle 3, so that said adjustment piece 13 can eccentrically turn about the bolt 9 in the through-hole 7 of the steering knuckle 3. Consequently, the adjustment piece 13 can be freely rotated about the bolt 9 between a position indicated by solid lines and positions indicated by two-dot chain lines, which are located at opposite sides of the former position, in FIG. 4B, with said rotatable lever portion 13A being coupled to a suitable tool, not shown. As shown in FIGS. 4A and 4B, the center line $C_1$ of a bolt receiving hole 13B formed in the main body of the adjustment piece 13 is offset upwardly by a dimension l from the center line $C_0$ of said adjustment piece 13 itself, whereby, as said adjustment piece 13 rotates about the bolt 9 in the through-hole 7 of the steering knuckle 3, the bolt 9 is guided by a guide hole 8 elongated in the axial direction of the strut of the support bracket 2 to move by an eccentrical distance l in the axial (or vertical) direction of the strut 1.

In addition, in this embodiment, as described above, the guide hole 8 of said support bracket 2 is an elongated slot in the axial direction of the strut 1 so that the crosswise movement of the bolt 9 can be prevented. Consequently, even if the adjustment piece 13 eccentrically rotates, the resultant eccentrical action due to the eccentrical rotation only moves the bolt 9 vertically along the guide hole 8, since the bolt 9 is prevented by said guide hole 8 from moving in the crosswise direction.

Furthermore, a bolt 14, i.e., second clamp means other than said first bolt 9 is provided at a portion adjacent the lower end of the flange portions of said support bracket 2, and said bolt 14 extends through said support bracket 2 and said steering knuckle 3, and can clamp the flange portions of the support bracket 2 against the steering knuckle 3 by clamping a nut 15 through washers 16 and 17 located at opposite sides.

Description will hereunder be given of operation of adjusting the camber angle with reference to this embodiment. Firstly, to adjust the camber angle, the nut 15 of the lower bolt 14 is loosened, whereby both the support bracket 2 and the steering knuckle 3 are brought into a condition where they can pivotally move about said bolt 14 relative to each other. In this condition, the suitable tool, not shown, is coupled to the rotatable lever portion 13A of the adjustment piece 13, upwardly projecting from the upper end of the steering knuckle 3 and said rotatable lever portion 13A is rotated through a desirable angle in the direction indicated by an arrow in FIG. 4B, whereby the adjustment piece 13 turns about the stem portion of the bolt 9 in the through-hole 7 of the steering knuckle 3, in which case said adjustment piece 13 effects an eccentrical rotation by the eccentrical distance l as shown in FIGS. 4A and 4B, so that the bolt 9 moves in the axial (or vertical) direction of the strut 1, while being prevented from moving in the crosswise direction by the guide hole 8 of the support bracket 2. At the same time, the eccentric adjustment piece 13 forces the upper end of the steering knuckle 3 to pivot around the bolt 14 against the flange 2 and the strut 1.

In that case, the vertical position of the bolt 9 with respect to the strut 1 is displaced by the eccentrical distance l as described above, whereas the positional relationship of the other bolt 14 with the strut 1 is not change at all. As a result, the angular relationship between the strut 1 and the steering knuckle 3 is changed, so that the camber angle of the vehicle can be variably adjusted.

For example, if the rotatable lever portion 13A of the adjustment piece 13 is rotated in the direction indicated by an arrow $B_1$ in FIGS. 2 and 4B, whereby the bolt 9 is moved downwardly due to the eccentrical action of the adjustment piece 13, at the same time, the eccentric adjustment piece 13 forces the upper end of the steering knuckle 3 to pivot around the bolt 14 against the flange 2 and the strut 1, and the strut 1 and the support bracket 2 are pivotally moved about the bolt 14 with respect to the steering knuckle 3. As a result, the strut 1 and the support bracket 2 are moved in the direction indicated by an arrow $B_2$ in FIG. 2, whereby the angular relationship between the strut 1 and the steering knuckle 3 is changed by the value of movement in the direction indicated by the arrow $B_2$, thus changing the camber angle of the vehicle.

In addition, in the preceding embodiment, there has been described that the bolt 9 is used as the bolt for adjusting the camber, and the other bolt 14 has the invariable positional relationship with the strut 1. However, said bolts 9 and 14 may function vice versa. Namely, such an arrangement of the camber adjusting device may be adopted that the bolt 9 in the preceding embodiment is used as the bolt for adjusting the camber angle, the adjustment piece 13 is provided on said bolt 14, while, the positional relationship of the bolt 9 with the strut 1 is made invariable.

As has been described above, according to the present invention, very useful functional effects can be combinedly offered that the camber angle in the strut type suspension system can be readily and freely variably adjusted only by rotating the rotatable lever portion of the adjustment piece, so that the harmful phenomena such as ununiform wear of tires can be prevented from occurring even when the camber angle has gone wrong due to some cause or other, and moreover, the camber adjusting device according to the present invention is very simple in construction and further, a very small space is required for installation thereof.

What is claimed is:

1. A camber adjusting device in a strut type suspension system having a substantially vertically extending strut and a steering knuckle connected to each other through a support bracket, wherein:
   the support bracket having a substantially vertically extending axially elongated slot and a through hole at opposite ends thereof, said bracket being fixedly secured to said strut;
   one end of the steering knuckle having two holes at positions corresponding to said slot and said hole of the support bracket;
   a first clamp means extending through the slot of the support bracket and one of the holes of the end of the steering knuckle and clamping the support bracket and the steering knuckle;
   a second clamp means extending through the hole of the support bracket and the other one of the holes of the end of the steering knuckle and clamping the support bracket and the steering knuckle;
   a manually rotatable eccentric adjustment piece on said first clamp means and extending through the one of the holes of the steering knuckle;
   whereby upon manual rotation of the adjustment piece it forces the steering knuckle to pivot the support bracket about the second clamp means and at the same time the first clamp means is moved substantially vertically along the elongated slot.

2. A camber adjusting device as set forth in claim 1, wherein said adjustment piece has a rotatable lever portion.

3. A camber adjusting device as set forth in claim 1, wherein said first and second clamp means are bolts.

* * * * *